US009530201B2

United States Patent
Marolle et al.

(10) Patent No.: US 9,530,201 B2
(45) Date of Patent: Dec. 27, 2016

(54) METHOD FOR THE NON-DESTRUCTIVE TESTING OF A BLADE PREFORM

(71) Applicant: SNECMA, Paris (FR)

(72) Inventors: Philippe Marolle, Wissous (FR); Bertrand Pierre Martin Leroyer, Fretoy (FR); Claude Leonetti, Courcouronnes (FR)

(73) Assignee: SNECMA, Paris (FR)

( * ) Notice: Subject to any disclaimer, the term of this patent is extended or adjusted under 35 U.S.C. 154(b) by 143 days.

(21) Appl. No.: 14/418,260

(22) PCT Filed: Aug. 1, 2013

(86) PCT No.: PCT/FR2013/051868
§ 371 (c)(1),
(2) Date: Jan. 29, 2015

(87) PCT Pub. No.: WO2014/020288
PCT Pub. Date: Feb. 6, 2014

(65) Prior Publication Data
US 2015/0302577 A1   Oct. 22, 2015

(30) Foreign Application Priority Data

Aug. 3, 2012  (FR) ...................................... 12 57613

(51) Int. Cl.
*G06T 7/00* (2006.01)

(52) U.S. Cl.
CPC ............ *G06T 7/0008* (2013.01); *G06T 7/001* (2013.01); *G06T 2207/10152* (2013.01); *G06T 2207/20164* (2013.01); *G06T 2207/30108* (2013.01)

(58) Field of Classification Search
CPC ...................................................... G06T 7/001
See application file for complete search history.

(56) References Cited

PUBLICATIONS

International Search Report issued Oct. 22, 2013 in PCT/FR2013/051868.
Liang Xinhe et al., "A Rapid Inspection Method for Large Water Turbine Blade", Proceedings of the 2010 IEEE International Conference on Mechatronics and Automation, XP031765839, Aug. 4-7, 2010, 5 pages.
Yong-Kai Zhu et al., "A Review of Optical NDT Technologies", Sensors 2011, vol. 11, No. 12, XP055055135, Aug. 8, 2011, pp. 7773-7798.
Kai Wolf et al., "An Approach to Computer-aided Quality Control Based on 3D Coordinate Metrology", Journal of Materials Processing Technology, vol. 107, No. 1-3, XP002245242, Apr. 19, 1999, pp. 96-110.

(Continued)

*Primary Examiner* — Siamak Harandi
*Assistant Examiner* — Menatoallah Youssef
(74) *Attorney, Agent, or Firm* — Oblon, McClelland, Maier & Neustadt, L.L.P.

(57) ABSTRACT

An automated method for the non-destructive testing of a woven preform for the manufacture of a turbine engine part and including a plurality of first marker threads intertwined with second marker threads, the first and second threads having light-reflecting properties that are different from those of the threads of the preform and being woven with the threads of the preform so as to form a surface grid on a given area of the preform. The method includes determining, with a plurality of consecutive steps, the spatial coordinates of the intersections between the first and second marker threads.

11 Claims, 6 Drawing Sheets

(56) References Cited

PUBLICATIONS

Ajay Kumar et al. "Computer-Vision-Based Fabric Defect Detection: A Survey", IEEE Transactions on Industrial Electronics, vol. 55, No. 1, XP011321122, Jan. 1, 2008, pp. 348-363.
A. Kus et al., "A Comparative Study of 3D Scanning in Engineering, Product and Transport Design and Fashion Design Education", Computer Applications in Engineering Education, vol. 17, No. 3, XP055055683, Sep. 1, 2009, pp. 263-271.

METHOD FOR THE NON-DESTRUCTIVE TESTING OF A BLADE PREFORM

The present invention concerns a method for the non-destructive testing of a woven preform, such as for example a turbine engine fan blade preform.

At the present time, fan blades are produced by weaving a preform followed by injecting a resin in the preform. Prior to the injection of resin, it is important to check certain parameters of the woven preform such as for example the fibre density and the orientation of the fibres.

To this end, producing a grid on an external surface of the blade such as the pressure or suction side of the blade is known, this grid being produced by means of first and second intertwined marker threads.

In order to determine the position of the intersections of the grid, the woven preform is placed opposite an arm carrying a laser that can be moved in a plane parallel to the horizontal facing the preform. The operator successively moves the laser at the various intersections of the grid so that the laser illuminates the intersections. The positions of the laser and therefore of the intersections are thus recorded successively.

From the measured real positions of the intersections, it is possible to derive information relating for example to the volume of fibres in the various areas of the preform delimited by the grid of the first and second tracer threads. These values are then compared with theoretical values, which makes it possible to determine whether the weaving has been carried out correctly and whether the operations subsequent to the weaving, such as cutting the edges of the preform, and prior to the non-destructive testing operation, have had any influence on the form of the preform.

However, this technique requires lengthy inspection times, and proves to be unreliable since it depends on the laser aiming carried out manually by an operator. In addition, it does not make it possible to measure the position of the intersections except in a plane substantially parallel to the movement plane of the laser, and it does not make it possible to take account of the position of the intersections along the axis of the laser and is therefore unsuitable for a woven fan blade preform that is not flat and is highly curved in the three dimensions in space.

The invention affords a simple and economical solution to this problem by allowing an automated non-destructive testing of the preforms of the aforementioned type.

To this end, it proposes an automated method for the non-destructive testing of a woven preform, intended for manufacturing a turbine engine part and comprising a plurality of first marker threads intertwined with second marker threads, the first and second threads having light-reflection properties different from those of the threads of the preform and being woven with the threads of the preform so as to form a surface grid on a given area of the preform, the method consisting successively of:

a) placing the preform in a predetermined position so that the grid of first and second marker threads is situated opposite at least two image sensors aimed at the grid and having optical axes forming an angle with each other;

b) illuminating the given area of the preform and acquiring, with each image sensor, an image of the grid of first and second marker threads;

c) determining for each image the coordinates in the reference frame of the image of the points of intersection of the first and second marker threads;

d) deducing the actual position in space of each point of intersection of the first and second marker threads on the preform by a triangulation calculation using the coordinates of the point of intersection in question in each of the images obtained with the image sensors and by means of the actual positions of the sensors in space and the orientation of their respective axes in space;

e) comparing the actual positions of the points of intersection of the first and second marker threads with three-dimensional theoretical positions of these same points of intersection.

According to the invention, the first and second marker threads have light-reflection properties different from those of the threads of the preform, which makes it possible to clearly distinguish them from the threads of the preform by a difference in contrast on the images taken at step b of the method according to the invention.

Unlike the prior art, the preform is placed on a support for positioning it in a predetermined position opposite two image sensors. Afterwards, the method consists of taking several images of the grid of the preform and automatically deriving therefrom the positions of the intersections of the grid formed by the first and second marker threads without any manual intervention by an operator, which increases the precision and repeatability of the measurements made.

Finally, the use of two image sensors, the optical axes of which form an angle with respect to each other, makes it possible to derive by triangulation the three coordinates X, Y, Z in space of each intersection, which was not possible with the prior art.

In a preferred embodiment of the invention, step c consists of:

determining on each image the contours of areas corresponding to the visible parts of the first and second marker threads;

determining for each image regions comprising aforementioned areas aligned on the first marker threads and the regions comprising aforementioned areas aligned on the second marker threads;

determining in each aforementioned image region the coordinates $(x_i, y_i)$ of the centre or barycentre of the various areas corresponding to the visible parts of the first and second marker threads and generating a mathematical curve such as an NURBS curve best passing through these coordinates $(x_i, y_i)$;

determining the coordinates of the points of intersection between the mathematical curves extending along the first marker threads and the curves extending along the second marker threads.

According to one embodiment of the invention, the contours of the areas corresponding to the visible parts of the first and second marker threads are determined by dynamic thresholding according to their form and the light-reflection level compared with the rest of the image.

In an embodiment of the invention, the centre of each visible-part area of the first and second marker threads is determined by assimilating each area to an ellipse. The assumption is thus made that the visible parts of the market threads all have a substantially elliptical form, which is the case because of the weaving of the first and second marker threads with the threads of the preform leading to an alternating passage above and below the threads of the preform.

Preferentially, steps b and c are repeated n times and the following steps, that is to say steps d and e, are initiated according to the calculation of a required criterion of precision of measurement of the coordinates of each intersection.

In a practical embodiment of the invention, the precision criterion consists of a standard deviation calculation on the coordinates of each intersection in each image, the steps following steps b and c being initiated for a standard deviation below a given threshold.

In one embodiment of the invention, the number n is greater than or equal to 10.

In the case of a turbine engine, the preform may be a fan blade preform and the grid of first and second marker threads can be formed on the convex face or the concave face of the blade.

According to another feature of the invention, the preform is woven with carbon threads and the marker threads are produced by an assembly of glass threads and carbon threads, the glass threads having a lighter colour than the carbon threads.

Advantageously, the preform is mounted on a support conformed so as to support the preform in a predetermined position and is then moved opposite the image sensors arranged inside a chamber with walls absorbing the light rays and housing means for illuminating the preform.

In a practical embodiment of the invention, the image sensors have a resolution of 10 megapixels and a focal length of approximately 8.5 mm.

Other advantages and features of the invention will emerge from a reading of the following description given by way of non-limitative example and with reference to the accompanying drawings, in which.

Figure 1:
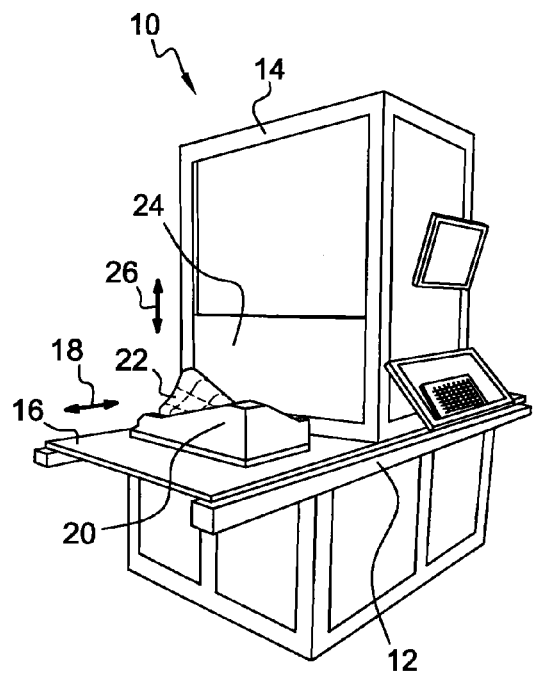
FIG. 1 is a schematic perspective view of a non-destructive testing device for implementing the method according to the invention.
Figure 3:
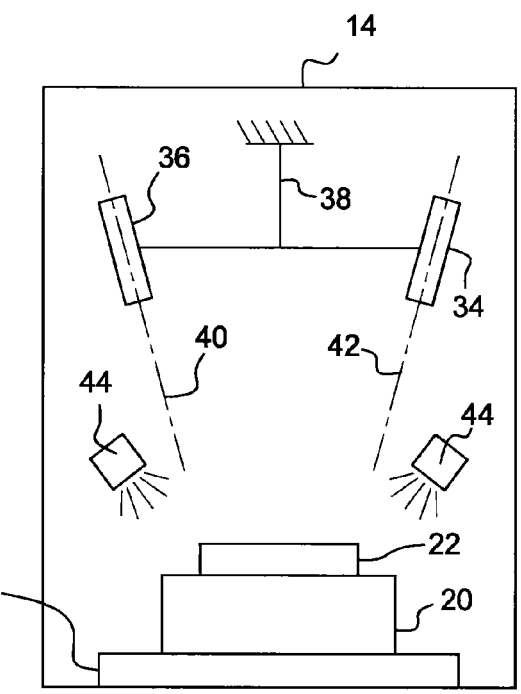
FIG. 3 is a schematic representation of the inside of the chamber of the device of FIG. 1.

FIG. 1 depicts schematically a device for implementing the method for the non-destructive testing of a woven fan blade preform proposed in the context of the invention, this device 10 comprising a frame 12 carrying a chamber 14 of parallelepipedal shape and a plate 16 movable in a horizontal direction 18 between a first position in which it is outside the chamber 14 and a second position where in which it is inside the chamber 14 (FIG. 3). The movable plate 16 carries a support 20 on which the blade preform 22 is placed in a predetermined position. The chamber 14 comprises a panel 24 able to move in translation in a direction 26 perpendicular to the horizontal direction 18 and revealing an opening through which the plate 16 is moved in order to come inside the chamber 14 (FIG. 1).

Figure 2:
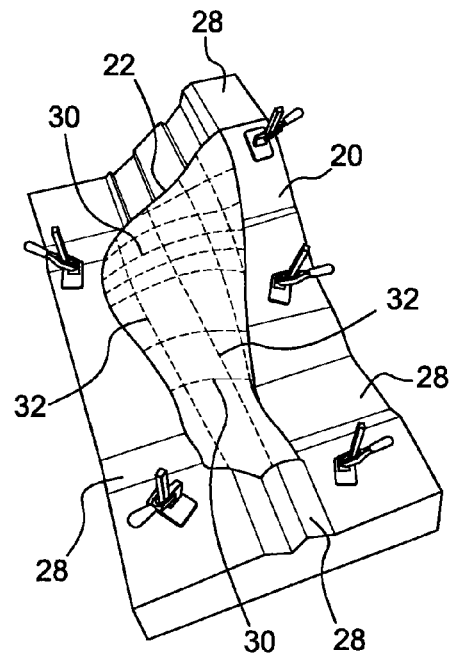
FIG. 2 is a schematic perspective view of a woven fan blade preform mounted on a support in a predetermined position.

FIG. 2 depicts the support 20 of the woven blade preform. This support comprises several protrusions 28 sized and distributed 20 so as to position the preform in a predetermined position on the support 20. The protrusions of the support prevent the blade preform 22, which has a certain flexibility, deforming and thus guaranteeing that the non-destructive testing operation will be carried out on a blade preform 22 conformed in three dimensions in a non-deformed state.

The blade preform 22 comprises a plurality of first marker threads 30 intertwined with second marker threads 32 and woven with the threads of the preform on the convex surface of the fan blade preform so as to form a grid. The first and second marker threads 30, 32 have light-reflection properties different from those of the threads of the preform so as to make the grid of first and second marker threads clearly visible with respect to the threads of the preform. In the example shown the marker threads 30, 32 are white in colour and the threads of the preform are black.

FIG. 3 shows the support 20 and the preform 22 inside the chamber 14 in which image-taking means are housed comprising at least two image sensors 34, 36 mounted on a support 38 at a known distance from each other and the axes 40, 42 of which form a known angle with each other. The blade preform 22 is arranged on its support 20 so that the two image sensors 30, 38 aim at the grid of first and second marker threads 30, 32. The chamber 14 also houses means 44 for illuminating the grid of the preform 22.

As shown in FIG. 1, the chamber 14 comprises walls opaque to light rays and absorbing the light rays that could be reflected towards the walls by the support 20, the preform 22 or any other element inside the chamber such as the image sensors 34, 36. In this way it is possible to properly control the intensity of the light sent to the blade preform 22 and the reflections on the walls of the chamber are limited. The light coming from outside is also limited.

Figure 4:
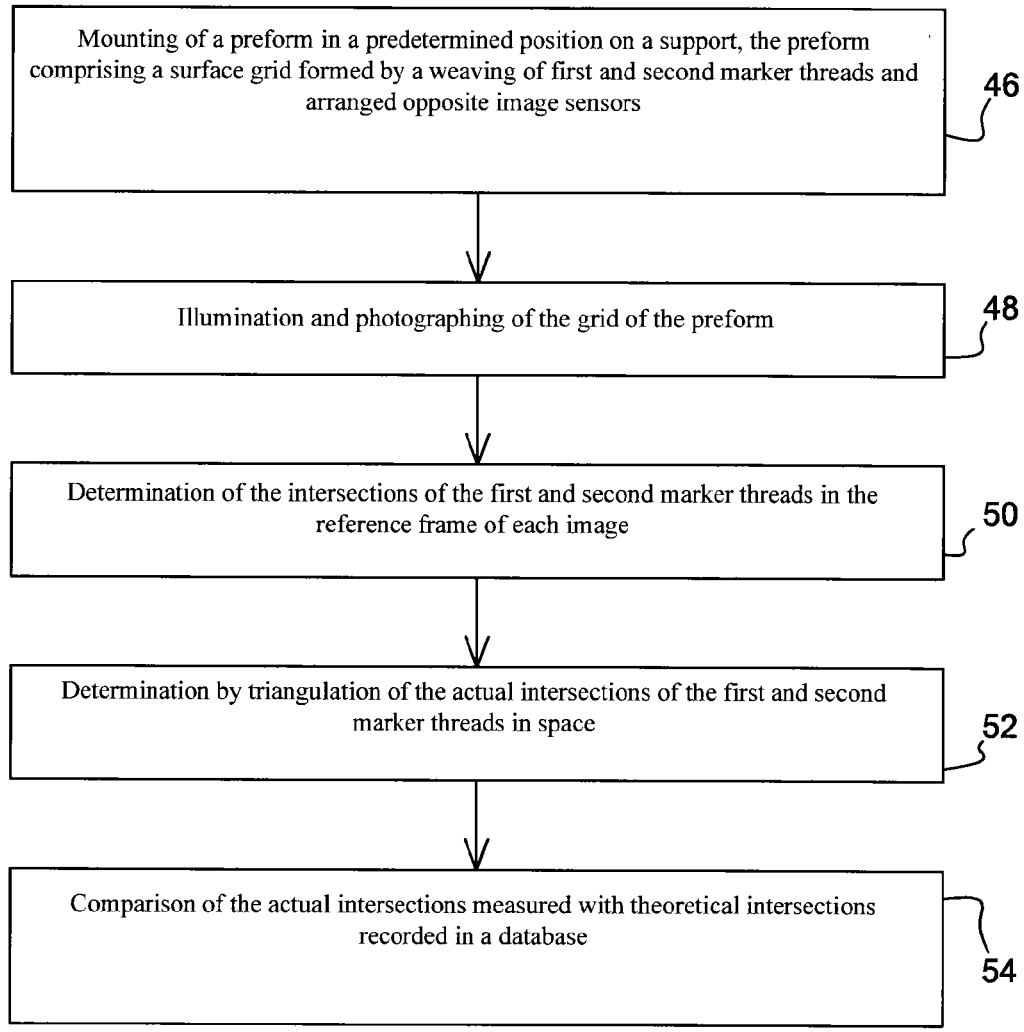
FIG. 4 illustrates the main steps of the method according to the invention.
Figure 5:
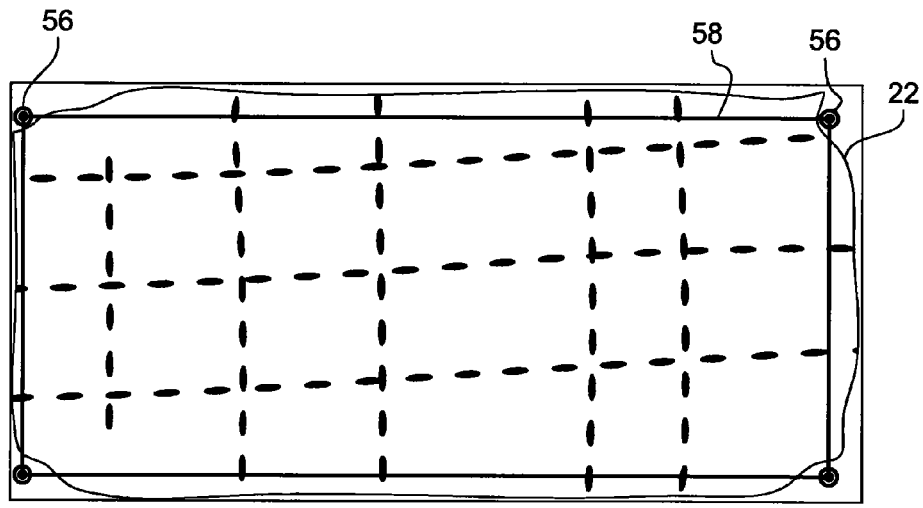
FIGS. 5 to 13 depict the various mathematical processing operations applied to the images of the preform, these figures showing schematically the images obtained, and the contrast has been intentionally reversed for ease of representation so that the reflective elements appear in black and vice versa.

In the remainder of the description, reference will be made simultaneously to FIG. 4 illustrating the major successive phases of the non-destructive testing method according to the invention and successively to FIGS. 5 to 13 showing images of the processing operations applied to the images taken with the image sensors.

In a first step 46, an operator positions the preform on its support 20 in a known predetermined position opposite the image sensors 34, 36.

In a second step 48, the method next consists of illuminating the grid of first and second marker threads 30, 32 of the preform with the illumination means and taking an image of this grid with each image sensor 34, 36.

In a third step 50, the method consists of determining the intersections of the first and second marker threads 30, 32 in the reference frame of each image. For this purpose, several mathematical processing operations are applied to the images taken with the sensors 34, 36 and are described below with reference to FIGS. 5 to 13.

Firstly, for each image, a working area 58 comprising the grid (FIG. 5) is determined from references 56 on the image. These references on the image are obtained by means of light-reflective members formed on the support 20.

A filter for suppressing noise and low frequencies of the image is applied to each working area 56 of each image so as to increase the contrast of the visible parts of the first and second marker threads 30, 32 with respect to the background of the image. This type of filtering by mathematical morphology is well known to persons skilled in the art and does not require any particular description.

Figure 6:
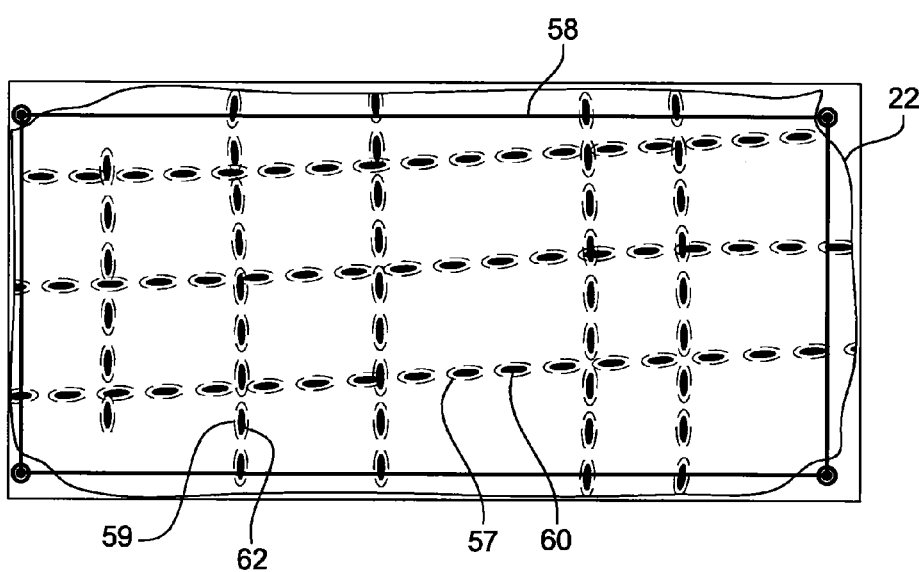
Figure 7:
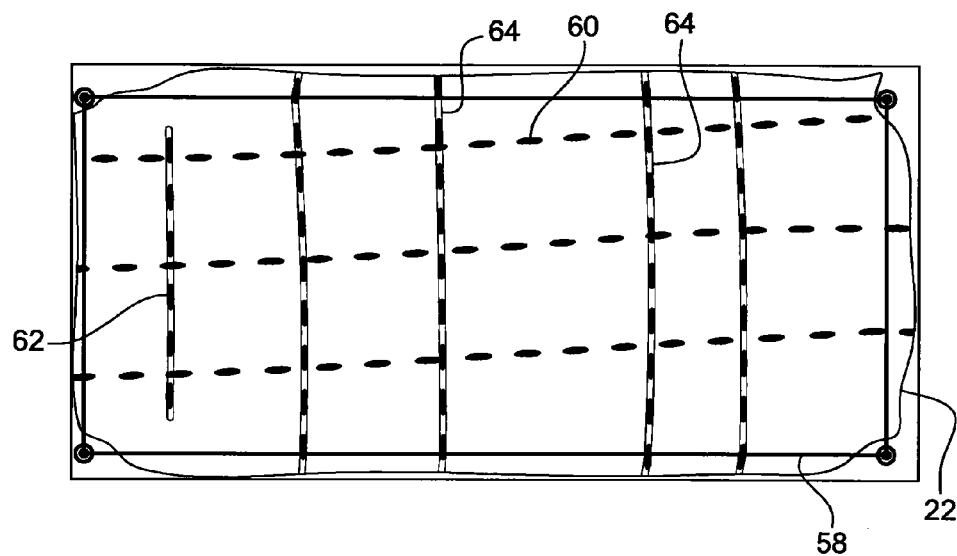
Figure 8:
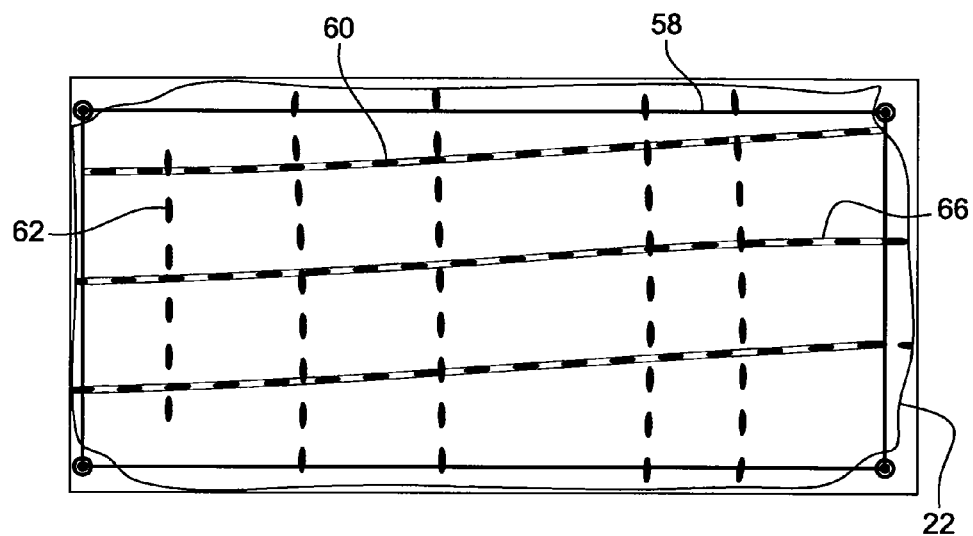

The contours 57, 59 of the areas corresponding to the visible parts of the first and second marker wires are next determined, by dynamic thresholding according to the form and reflection level of the light of the visible parts 60, 62 with respect to the rest of the image (FIG. 6). This type of thresholding, known to persons skilled in the art, consists of isolating the pixels of the image according to a given form, a contour and a level of grey with respect to the background of the image. This type of filter is also based on the identification frequency of the pixels of marker threads and their levels of grey.

In particular, because of the weaving of the first and second marker threads 30, 32 with the threads of the preform leading to an alternating passage of marker threads above and below the threads of the preform, the visible parts 60, 62 of the first and second marker threads 30, 32, that is to say the parts situated above the threads of the preform, have a roughly elliptical shape and this information can thus be used as a discriminating parameter for detecting the visible parts of the first and second marker threads in each image.

It is then possible to determine, for each visible part 60, 62 of a marker thread 30, 32 the coordinates $x_i$, $y_i$ of the centre of the ellipse.

Next the regions 64 of the image comprising visible parts of marker threads aligned along the first marker threads 30 (FIG. 7) and the areas 66 comprising visible parts aligned along the second marker threads 32 (FIG. 8) are determined.

Figure 9:
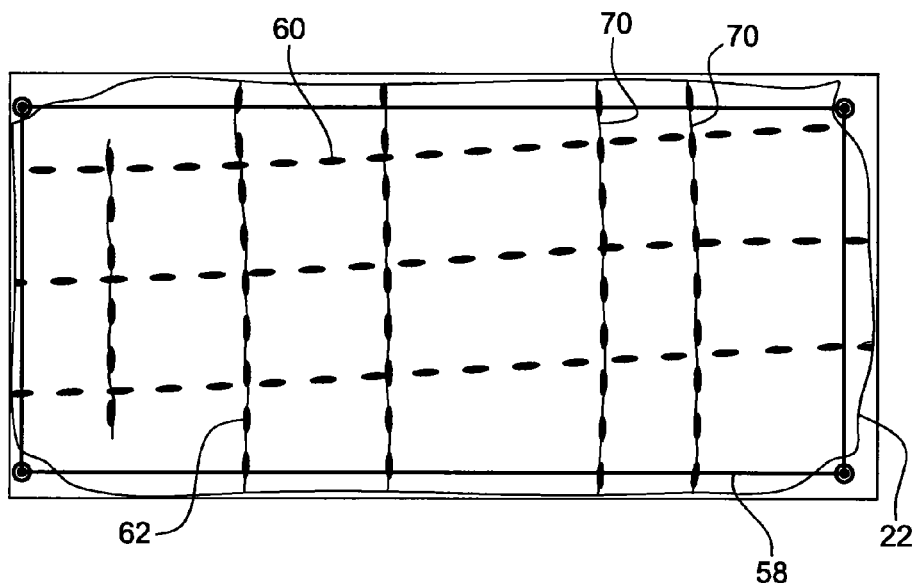
Figure 10:
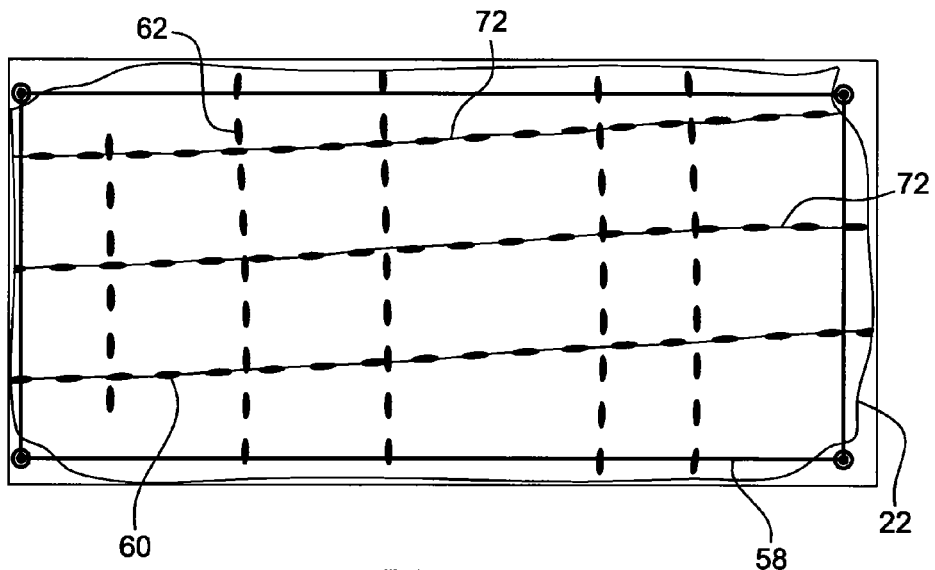
Figure 11:
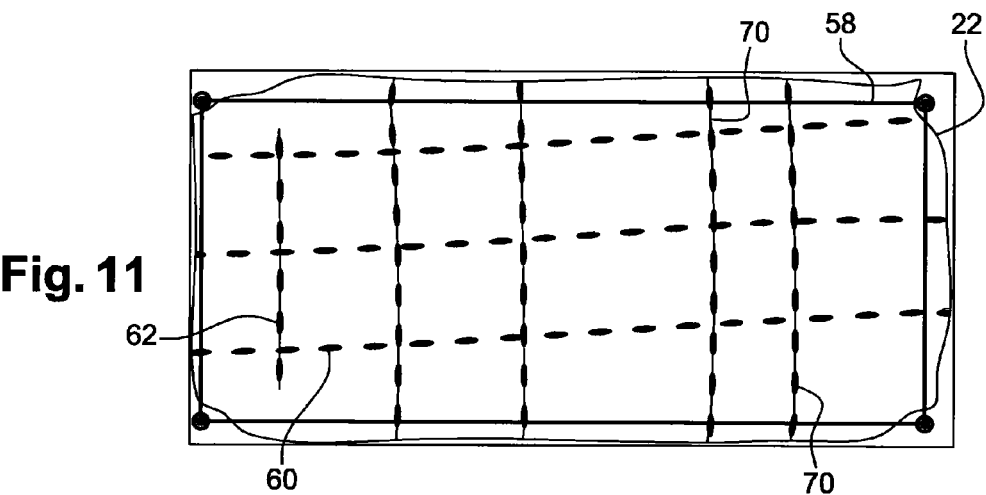
Figure 12:
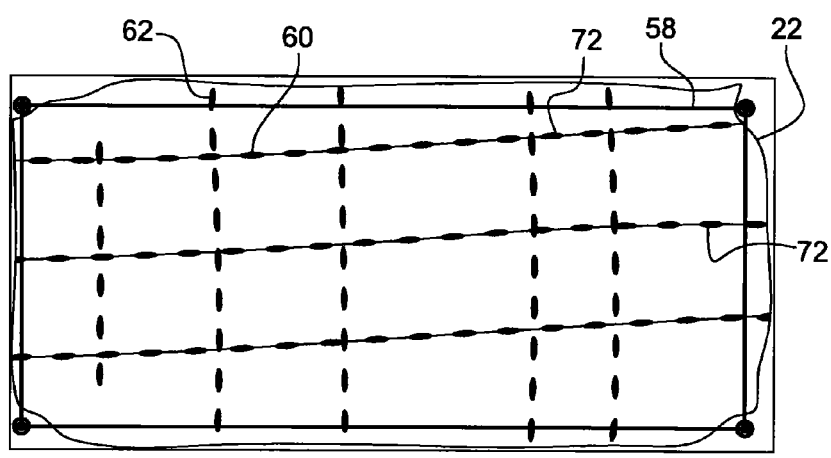

In each region 64, 66 thus delimited, a mathematic curve such as an NURBS curve best passing through the coordinates $x_i$, $y_i$ corresponding to the centre of the visible parts belonging to this region 64, 66 is next determined. FIG. 9 shows the mathematical curves 70 obtained in the regions 64 oriented along the first marker threads 30 and FIG. 10 shows the mathematical curves 72 obtained in the regions 66 oriented along the second marker threads 32.

Figure 13:
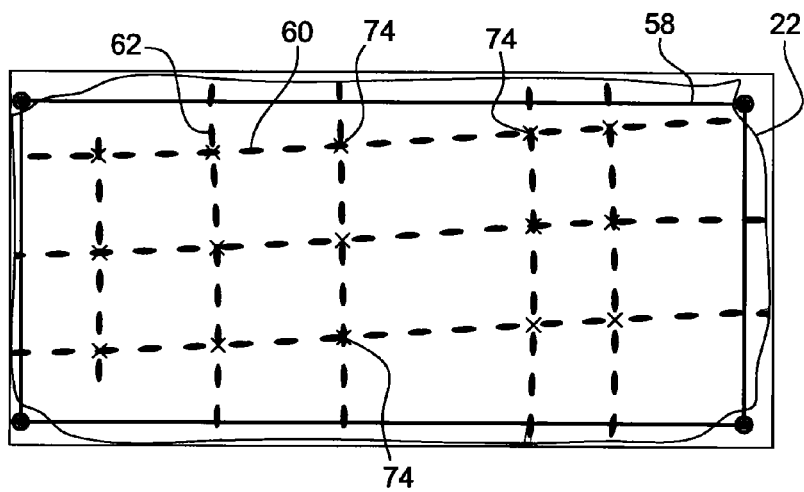

A smoothing of the mathematical curves 70, 72 is next carried out (FIGS. 11 and 12) in order to eliminate the curvature aberrations on the mathematical curves and the coordinates of the points of intersection 74 between the mathematical curves extending along the first and second marker threads 30, 32 are then determined (FIG. 13). These intersections will be denoted $I(x_{sensor1}, y_{sensor1})$ for a given intersection I in the reference frame of the image obtained with the first sensor 34 and $I(x_{sensor2}, y_{sensor2})$ for the same intersection in the reference frame of the image obtained with the second sensor 36.

Thus, for each image obtained with each image sensor, the coordinates of all the points of the intersection of the first and second marker threads 30, 32 in the reference frame of an image associated with the sensor 34, 36 are known.

In a fourth step 52, the method consists of deducing the actual coordinates X, Y and 2 in the space of each point of intersection I by a triangulation calculation using the coordinates of the points in the image obtained with the first sensor $x_{sensor1}$, $y_{sensor1}$ the coordinates of the point in the image obtained with the second sensor $x_{sensor2}$, $y_{sensor2}$ and the actual positions of the sensors 34, 36 in space and the orientation of their respective axes 40, 42 in space (FIG. 4).

Finally, in a fifth step 54, the actual positions of the points of intersection of the first and second marker threads 30, 32 are compared with the three-dimensional theoretical positions of these same points of intersection contained in a database, which makes it possible to deduce therefrom whether or not the preform 22 has been correctly woven.

In a particular embodiment of the invention, the third step 50 of the method is performed on n images obtained with the first image sensor 34 and on n images obtained with the second image sensor 36. Thus, for a given intersection I of the grid of the first and second marker threads, 2n pairs of points of coordinates $x_{i,j}$, $y_{i,j}$ are obtained where i corresponds to the $i^{th}$ image taken with the sensor j, i being between 1 and n and j taking the value 1 identifying the first image sensor and the value 2 identifying the second image sensor.

A first set of n pairs of points $x_{i,1}$, $y_{i,1}$ corresponds to the coordinates of the point I of the grid in the reference frame of the images obtained with the first sensor 34 and a second set of n pairs of points $x_{i,2}$, $y_{i,2}$ corresponds to the coordinates of the point I of the grid in the reference frame of the images obtained with the second sensor 36.

For each point I measured with the first camera, it is checked that the standard deviation between the values $x_{i,1}$ is less than a first given threshold and that the standard deviation between the values $y_{i,1}$ is less than a second given threshold.

The same operation is performed with the coordinates of the point I $x_{i,2}$ and $y_{i,2}$ obtained with the second camera.

The first threshold and the second threshold may be identical and for example equal to a value of 0.75 pixels. In a practical embodiment of the device, a pixel corresponds to approximately 0.2 mm.

The number n of images is advantageously greater than or equal to 10.

In one embodiment of the invention, the illumination means 44 are light emitting diodes the light intensity of which is calibrated so as to optimise the contrast between the first and second marker threads 30, 32 and the threads of the preform.

The image sensors 34, 36 are cameras with a matrix of photodetectors of the CCD or CMOS type having for example a resolution of 10 megapixels and a focal length of approximately 8.5 mm.

The first and second marker threads 30, 32 are for example produced by an assembly of glass threads and carbon threads. The preform is for example produced by weaving carbon threads. The glass threads have a lighter colour than the carbon threads.

In a variant embodiment of the invention, it is possible to use a number of image sensors greater than 2, the axis of each sensor forming a non-zero angle with the axis of the other sensor, the axes of the sensors being oriented in the direction of the grid of the preform. The use of several sensors improves the precision of detection of the intersections of the first and second marker threads on the preform by having images taken at several different viewing angles.

The method according to the invention can be used for the non-destructive testing of any type of woven preform having a surface grid as described previously and is not limited to the preforms of fan blades. In particular, it could be used with preforms such as those used for manufacturing inter-blade platforms or casings.

The invention claimed is:

1. An automated method for the non-destructive testing of a woven preform, for manufacturing a turbine engine part and comprising a plurality of first marker threads intertwined with second marker threads, the first and second threads having light-reflection properties different from those of the threads of the preform and being woven with the threads of the preform so as to form a surface grid on a given area of the preform, the method comprising successively of:
   a) placing the preform in a predetermined position so that the grid of first and second marker threads is situated opposite at least two image sensors aimed at the grid and having optical axes forming an angle with each other;
   b) illuminating the given area of the preform and acquiring, with each image sensor, an image of the grid of first and second marker threads;
   c) determining for each image the coordinates in the reference frame of the image of the points of intersection of the first and second marker threads;

d) deducing the actual position in space of each point of intersection of the first and second marker threads on the preform by a triangulation calculation using the coordinates of the point of intersection in question in each of the images obtained with the image sensors and by means of the actual positions of the sensors in space and the orientation of their respective axes in space;

e) comparing the actual positions of the points of intersection of the first and second marker threads with three-dimensional theoretical positions of these same points of intersection.

2. A method according to claim 1, wherein step c comprises:

determining on each image the contours of areas corresponding to the visible parts of the first and second marker threads;

determining for each image regions comprising aforementioned areas aligned on the first marker threads and the regions comprising aforementioned areas aligned on the second marker threads;

determining in each aforementioned image region the coordinates $(x_i, y_i)$ of the centre of barycentre of the various areas corresponding to the visible parts of the first and second marker threads and generating a mathematical curve best passing through these coordinates $(x_i, y_i)$;

determining the coordinates of the points of intersection between the mathematical curves extending along the first marker threads and the curves extending along the second marker threads.

3. A method according to claim 2, wherein the contours of the areas corresponding to the visible parts of the first and second marker threads are determined by dynamic thresholding according to their form and the light-reflection level compared with the rest of the image.

4. A method according to claim 2, wherein the centre of each visible-part area of the first and second marker threads is determined by assimilating each part area to an ellipse.

5. A method according to claim 1, wherein steps b and c are repeated n times and in that the following steps are initiated according to the calculation of a required criterion of precision of measurement of the coordinates of each intersection.

6. A method according to claim 5, wherein the precision criterion comprises a standard deviation calculation on the coordinates of each intersection in each image, the steps following steps b and c being initiated for a standard deviation below a given threshold.

7. A method according to claim 5, wherein the number n is greater than 10.

8. A method according to claim 1, wherein the preform is a fan blade preform and wherein the grid of first and second marker threads is formed on the convex face or the concave face of the blade preform.

9. A method according to claim 7, wherein the preform is woven with carbon threads and wherein the marker threads are produced by an assembly of glass threads and carbon threads, the glass threads having a lighter colour than the carbon threads.

10. A method according to claim 1, wherein the preform is mounted on a support conformed so as to support the preform in a predetermined position and is then moved opposite the image sensors inside a chamber with walls absorbing light rays and housing means for illuminating the preform.

11. A method according to claim 1, wherein the image sensors are cameras with a matrix of photodetectors of the CCD or CMOS type having a resolution of approximately 10 megapixels and a focal length of approximately 8.5 mm.

* * * * *

UNITED STATES PATENT AND TRADEMARK OFFICE
CERTIFICATE OF CORRECTION

PATENT NO. : 9,530,201 B2  Page 1 of 1
APPLICATION NO. : 14/418260
DATED : December 27, 2016
INVENTOR(S) : Philippe Marolle et al.

It is certified that error appears in the above-identified patent and that said Letters Patent is hereby corrected as shown below:

Column 5, Line 45, change "2" to --Z--

Signed and Sealed this
Third Day of October, 2017

Joseph Matal
*Performing the Functions and Duties of the*
*Under Secretary of Commerce for Intellectual Property and*
*Director of the United States Patent and Trademark Office*